United States Patent
Demmig et al.

(10) Patent No.: US 12,486,350 B2
(45) Date of Patent: Dec. 2, 2025

(54) TWO-COMPONENT POLYURETHANE COMPOSITION WITH A HIGH DEGREE OF HYDROPHOBICITY AND ADJUSTABLE POT LIFE

(71) Applicant: SIKA TECHNOLOGY AG, Baar (CH)

(72) Inventors: Martin Demmig, Quickborn (DE); Steffen Kelch, Oberengstringen (CH); Antonio Corsaro, Regensdorf (CH)

(73) Assignee: SIKA TECHNOLOGY AG, Baar (CH)

( * ) Notice: Subject to any disclaimer, the term of this patent is extended or adjusted under 35 U.S.C. 154(b) by 695 days.

(21) Appl. No.: 17/792,458

(22) PCT Filed: Mar. 18, 2021

(86) PCT No.: PCT/EP2021/056953
§ 371 (c)(1),
(2) Date: Jul. 13, 2022

(87) PCT Pub. No.: WO2021/191045
PCT Pub. Date: Sep. 30, 2021

(65) Prior Publication Data
US 2023/0047357 A1    Feb. 16, 2023

(30) Foreign Application Priority Data
Mar. 25, 2020   (EP) ..................... 20165528

(51) Int. Cl.
| | |
|---|---|
| C08G 18/12 | (2006.01) |
| C08G 18/22 | (2006.01) |
| C08G 18/32 | (2006.01) |
| C08G 18/38 | (2006.01) |
| C08G 18/48 | (2006.01) |
| C08G 18/69 | (2006.01) |

(52) U.S. Cl.
CPC .......... *C08G 18/12* (2013.01); *C08G 18/227* (2013.01); *C08G 18/3206* (2013.01); *C08G 18/3876* (2013.01); *C08G 18/4841* (2013.01); *C08G 18/4845* (2013.01); *C08G 18/69* (2013.01); *C08G 2170/00* (2013.01)

(58) Field of Classification Search
CPC .. C08G 18/12; C08G 18/227; C08G 18/3206; C08G 18/3876; C08G 18/4841; C08G 18/4845; C08G 18/69; C08G 2170/00; C08G 18/4018; C08G 18/4233; C08G 18/4241; C08G 18/485; C08G 18/4879; C08G 18/664; C08G 18/6674; C08G 18/7671; C08G 18/4829; C09J 175/06; C09J 175/08
See application file for complete search history.

(56) References Cited

U.S. PATENT DOCUMENTS

| | | |
|---|---|---|
| 4,812,524 A | 3/1989 | Baghdachi |
| 5,587,448 A | 12/1996 | Engen |

FOREIGN PATENT DOCUMENTS

| | | |
|---|---|---|
| CN | 1171123 A | 1/1998 |
| CN | 110669469 A | 1/2020 |
| CN | 110809589 A | 2/2020 |
| EP | 2 791 153 B1 | 4/2015 |
| EP | 1 551 895 B1 | 1/2017 |
| WO | 2004/033519 A1 | 4/2004 |
| WO | 2013/087682 A1 | 6/2013 |
| WO | 2017/017089 A1 | 2/2017 |
| WO | 2019/002538 A1 | 1/2019 |
| WO | 2019/195045 A1 | 10/2019 |

OTHER PUBLICATIONS

Jun. 7, 2021 International Search Report issued in International Patent Application No. PCT/EP2021/056953.
Sep. 22, 2022 International Preliminary Report on Patentability issued in International Patent Application No. PCT/EP2021/056953.

*Primary Examiner* — Randy P Gulakowski
*Assistant Examiner* — Holley Grace Hester
(74) *Attorney, Agent, or Firm* — Oliff PLC

(57) ABSTRACT

A polyurethane composition includes first and second components, wherein the first component contains between 30% and 99% by weight of a polyol mixture including 100 parts by weight of at least one hydrophobic polyol, 10 to 75 parts by weight of at least one hydrophilic polyol, 0 to 25 parts by weight of at least one diol having two hydroxyl groups linked via a C2 to C9 carbon chain; and also at least one compound having at least one thiol group; and the second component includes at least one polyisocyanate, wherein one of the two components additionally includes at least one metal catalyst for the reaction of hydroxyl groups and isocyanate groups that is able to form thio complexes and the molar ratio of all the thiol groups in the at least one compound to all metal atoms in the at least one metal catalyst is between 1:1 and 250:1.

13 Claims, No Drawings

TWO-COMPONENT POLYURETHANE COMPOSITION WITH A HIGH DEGREE OF HYDROPHOBICITY AND ADJUSTABLE POT LIFE

TECHNICAL FIELD

The invention relates to the field of two-component polyurethane compositions and to the use thereof, in particular as adhesive or as matrix in composite materials.

STATE OF THE ART

Two-component polyurethane compositions based on polyols and polyisocyanates have already been used for some time. Two-component polyurethane compositions have the advantage over one-component compositions that they cure rapidly after mixing and can therefore absorb and transmit higher forces after just a short time. For use as structural adhesives or as matrix (binder) in composite materials, such compositions must meet high demands as regards strength and adhesive forces, since such adhesives are elements of load-bearing structures. In particular, such compositions when cured need to have good mechanical properties such as high moduli of elasticity, while having low elongation values and high tensile strength and tensile shear strength, but must not be brittle at the same time. It is moreover desirable, for example in industrial manufacturing, for such compositions to cure as rapidly as possible, which reduces throughput times.

In order to achieve the desired mechanical properties and above all particularly rapid curing, it is advantageous when such compositions contain high proportions of isocyanates that are present in one of the two components in the form of free or polymer-bound polyisocyanates and that, after mixing with the other component, which contains polyols, cure to form a polymeric network. A high content of isocyanates does however lead to problems. Particularly with the use of crosslinking catalysts, which is essential for selective, optimal crosslinking and curing, such two-component systems become almost uncontrollably fast and pot lives much too short for use, for example, as a structural adhesive. For use as a binder in composite materials, the pot life also needs to be long enough to allow fibers to be embedded homogeneously in the matrix.

For the use of two-component polyurethane compositions, it is generally desirable if an adequately long pot life can be combined with subsequently very rapid curing and extremely rapid development of strength. However, this is hardly achievable with today's two-component compositions. Either the pot life is very short in the case of compositions that cure and develop strength rapidly or else curing and the development of strength are slow when handling compositions that have a long pot life.

Two-component polyurethane compositions have therefore been developed that have a long pot life which can even be adjusted within certain limits, thus allowing larger components or production parts to processed too, but that after application also cure very rapidly and exhibit strength and elasticity, in the sense of structural bonding, within an extremely short time, for example hours to a few days. One such two-component polyurethane composition is disclosed in WO 2019/002538 A1. This publication teaches special catalyst systems comprising a metal catalyst and compounds containing thiol groups, which allow an adjustable, long pot life and then very rapid curing of the composition.

A similar two-component polyurethane composition comprising such a catalyst system is disclosed in U.S. Pat. No. 5,587,448 A. The two-component polyurethane compositions taught therein are mostly based on various polypropylene glycol-based polyether polyols and are particularly suitable as coatings.

In the case of two-component polyurethane compositions it is possible, through suitable assembly of the individual components, to achieve a broader spectrum of mechanical properties ranging from soft elastic to highly structured properties.

Moreover, two-component polyurethane compositions, as well as the abovementioned rapid development of strength, have the further advantage that they can consist exclusively of hydrophobic raw materials, in particular by using polymers containing isocyanate groups and that are based on hydrophobic polyols. This is far less possible with one-component polyurethanes that cure via atmospheric moisture, since the diffusion of water in hydrophobic compositions is severely limited. As a result of the hydrophobicity, the adhesives obtained from such two-component compositions after curing generally have only low water absorption and show improved aging resistance. The mechanical properties are also often very good. In addition, the development of adhesion on low-energy surfaces such as polyolefins or polycarbonates is significantly improved compared to polyurethanes based on polar units.

An example of a polyurethane adhesive based on hydrophobic polybutadienes is described in U.S. Pat. No. 4,812,524 A. The adhesives disclosed in U.S. Pat. No. 4,812,524 are based on combinations of amine- and hydroxyl-terminated polybutadienes, which are reacted with polyisocyanates to give polyurethanes. The adhesives described are said to feature excellent adhesive properties and strong binding to steel substrates.

Another two-component hydrophobic polyurethane adhesive is taught in WO 2017/017089 A1. The compositions disclosed in this publication are based on hydrophobic polybutadiene polyols and also hydrophobic diols selected from polybutadiene diols, polyester diols, polycarbonate diols and also from polyether diols that have at least 4 carbon atoms in their repeat unit. Mercaptosilanes are also taught, but only as adhesion promoters.

CN 110 669 469 A likewise teaches hydrophobic, two-component structural polyurethane adhesives, for example based on polybutadiene polyols and polyester polyols. A mercaptosilane is taught here too, but only as a silane crosslinker.

WO 2019/195045 A1 likewise teaches hydrophobic, two-component polyurethane compositions as adhesives, specifically for polypropylene substrates. These compositions are based on hydrophobic polyols selected from poly(butylene oxide) polyols, polybutadiene polyols, and acrylate polyols. A dioctyltin dimercaptide catalyst is used in the examples.

However, such hydrophobic two-component polyurethane compositions comprising polymers that contain isocyanate groups and are based on hydrophobic polyols are very poorly compatible with the special catalyst system having an adjustable, long pot life and rapid curing described hereinabove. It has been found that such hydrophobic two-component polyurethane compositions cannot readily be catalyzed via the system taught for example in WO 2019/002538 A1. The effect of rapid curing after the end of the pot life is far less pronounced than in the case of hydrophilic polyurethane compositions as disclosed in WO 2019/002538 A1.

It would therefore be desirable to obtain a hydrophobic two-component polyurethane composition that has all the advantages of such a hydrophobic composition as described above, but that still contains a catalyst system that exhibits a long, adjustable pot life and subsequent extremely rapid curing.

SUMMARY OF THE INVENTION

The object of the present invention is therefore to provide a hydrophobic two-component polyurethane composition that cures very rapidly to form a mechanically excellent mass suitable as structural adhesive or as matrix for composite materials, but at the same time has an adequately long pot life that can be adjusted within certain limits, allowing it to be handled without problem.

This object is surprisingly achieved with the polyurethane composition of the invention as claimed in claim 1. It comprises a polyol mixture containing at least one hydrophobic polyol and at least one hydrophilic polyol, optionally a short-chain diol, and also a compound having at least one thiol group in the first component and a polyisocyanate in the second component. For curing the composition, the composition further contains a metal catalyst that is able to form thio complexes, the ratio of thiol groups to metal atoms in the composition being fixed. The composition has very high strength and good elasticity when cured. After mixing the components and after an adequately long pot life that is adjustable within certain limits, it cures very rapidly and achieves very good mechanical values after just a short time, for example a few hours to one day.

Further aspects of the invention are the subject of further independent claims. Particularly preferred embodiments of the invention are the subject of the dependent claims.
Ways of Executing the Invention The present invention relates to a polyurethane composition consisting of a first component A and a second component B, wherein
 the first component A comprises
  between 30% and 99% by weight based on component A of a polyol mixture P comprising
   100 parts by weight of at least one hydrophobic polyol P1,
   10 to 75 parts by weight of at least one hydrophilic polyol P2,
   0 to 25 parts by weight of at least one diol P3 having two hydroxyl groups that are linked via a C2 to C9 carbon chain, and also
  at least one compound T having at least one thiol group; and
 the second component B comprises
  at least one polyisocyanate I;
wherein one of the two components additionally comprises at least one metal catalyst K for the reaction of hydroxyl groups and isocyanate groups that is able to form thio complexes and
the molar ratio of all the thiol groups in the at least one compound T to all metal atoms in the at least one metal catalyst K is between 1:1 and 250:1.

The prefix "poly" in substance names such as "polyol", "polyisocyanate", "polyether" or "polyamine" in the present document indicates that the respective substance formally contains more than one of the functional group that occurs in its name per molecule.

The term "polymer" in the present document firstly encompasses a collective of macromolecules that are chemically uniform but differ in the degree of polymerization, molar mass, and chain length, said collective having been produced by a "poly" reaction (polymerization, polyaddition, polycondensation).

The term secondly also encompasses derivatives of such a collective of macromolecules from "poly" reactions, i.e. compounds obtained by reactions, for example additions or substitutions, of functional groups on defined macromolecules and that may be chemically uniform or chemically nonuniform.

The term further encompasses so-called prepolymers too, i.e. reactive oligomeric initial adducts, the functional groups of which are involved in the formation of macromolecules.

The term "polyurethane polymer" encompasses all polymers produced according to the so-called diisocyanate polyaddition process. This also includes polymers that are virtually or completely free of urethane groups.

Examples of polyurethane polymers are polyether polyurethanes, polyester polyurethanes, polyether polyureas, polyureas, polyester polyureas, polyisocyanurates, and polycarbodiimides.

"Molecular weight" is in the present document understood to mean the molar mass (in grams per mole) of a molecule or a molecule residue. "Average molecular weight" refers to the number average $M_n$ of a polydisperse mixture of oligomeric or polymeric molecules or molecule residues, which is typically determined by gel-permeation chromatography (GPC) against polystyrene as standard.

Percent by weight values, abbreviated to % by weight, refer to the proportions by mass of a constituent in a composition based on the overall composition, unless otherwise stated. The terms "mass" and "weight" are used synonymously in the present document.

A "primary hydroxyl group" refers to an OH group attached to a carbon atom having two hydrogens.

"Pot life" refers in this document to the time within which, after mixing the two components, the polyurethane composition can be processed before the viscosity resulting from the progression of the crosslinking reaction has become too high for further processing.

The term "strength" in the present document refers to the strength of the cured composition, strength meaning in particular the tensile strength and modulus of elasticity, particularly in the 0.05% to 0.25% elongation range or in the 0.5 to 5.0% range.

"Room temperature" in the present document refers to a temperature of 23° C.

A substance or a composition is described as "storage-stable" or "storable" if it can be stored at room temperature in a suitable container for a relatively long period, typically at least 3 months up to 6 months or longer, without this storage resulting in any change in its application or use properties, especially in the viscosity and crosslinking rate, to an extent relevant to the use thereof.

All industry standards and norms mentioned in this document relate to the versions valid at the date of first filing.

The "average OH functionality" is the number of OH groups per polymer molecule, averaged over all the polymer molecules. If, for example, 50% of all polymer molecules contain two hydroxyl groups and the other 50% contain three, the result is an average OH functionality of 2.5. The average OH functionality can in particular be determined by calculation from the hydroxyl value and the molecular weight $M_n$ determined via GPC.

The polyurethane composition of the invention consists of a first component A and a second component B, which are mixed only on application of the polyurethane composition and are stored prior to this in separate packagings.

The first component A contains between 30% and 99% by weight based on component A of a polyol mixture P, comprising
100 parts by weight of at least one hydrophobic polyol P1,
10 to 75 parts by weight of at least one hydrophilic polyol P2,
0 to 25 parts by weight of at least one diol P3 having two hydroxyl groups that are linked via a C2 to C9 carbon chain; and also at least one compound T having at least one thiol group.

The first component A thus initially contains at least one hydrophobic polyol P1. This is present in the polyol mixture P that is present in the composition of the invention in a content of between 30% by weight and 90% by weight based on component A.

The polyol mixture P preferably has a content in component A of between 40% and 80% by weight, especially between 45% and 75% by weight, most preferably between 50% and 70% by weight, based on component A.

The polyol mixture P comprises 100 parts by weight of at least one hydrophobic polyol P1.

The hydrophobic polyol P1 preferably has an OH functionality within a range from 1.5 to 4 and an average molecular weight within a range from 250 to 15 000 g/mol.

The term "hydrophobic" is in connection with the polyol P1 to be understood to mean that the parent polymer of the polyol has not been significantly modified with hydrophilic functionalities, for example in the form of polar functional groups on the main chain or appended side chains formed from hydrophilic polyethers such as polyethylene glycols and polypropylene glycols, since such modifications would significantly impair the hydrophobic properties. In the context of the invention, it is accordingly preferable when the parent polymer of the polyol P1 consists of the materials mentioned, i.e. of polybutadiene, polyesters, polycarbonates, and polyethers with a repeat unit having at least 4 carbon atoms. A polyether having at least 4 carbon atoms in the repeat unit, for example a poly(butylene oxide) polyol or a poly(tetramethylene glycol), or a poly(butylene glycol) is regarded as a hydrophobic polyol.

Suitable as the hydrophobic polyol P1 are in particular polybutadiene polyols, hydrophobic polyester polyols, hydrophobic polycarbonate polyols, dimer fatty acid-based polyester polyols, and hydrophobic polyether polyols with a repeat unit having at least 4 carbon atoms between two ether oxygens, for example a poly(butylene oxide) polyol.

In preferred embodiments hydrophobic the hydrophobic polyol P1 is a polybutadiene polyol, a dimer fatty acid-based polyester polyol, a polytetramethylene oxide diol, or a mixture of said polyols.

Preference as hydrophobic polyol P1 is given to polybutadiene polyols having an average molecular weight within a range from 2000 to 10 000 g/mol and an average OH functionality within a range from 2.1 to 4.

The average molecular weight of the polybutadiene polyol is preferably within a range from 2000 to 4000 g/mol, especially within a range from 2500 to 3000 g/mol.

The average OH functionality of the polybutadiene polyol is preferably within a range from 2.1 to 2.9, especially within a range from 2.3 to 2.7.

Such a polybutadiene polyol is obtainable in a simple manner and has comparatively low viscosity, which permits good processability of the composition.

Suitable polybutadiene polyols are especially obtainable by polymerization of 1,3-butadiene and allyl alcohol in a suitable ratio or by oxidation of suitable polybutadienes or of the hydrogenation products thereof.

Suitable polybutadiene polyols especially contain structural elements of formula (I) and optionally structural elements of formula (II) or (III).

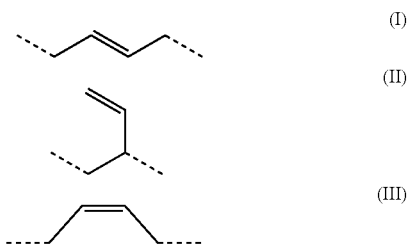

A preferred polybutadiene polyol contains
40 to 80%, especially 55% to 65%, of the structural element of formula (I),
0 to 30%, especially 15% to 25%, of the structural element of formula (II),
0 to 30%, especially 15% to 25%, of the structural element of formula (III).

A particularly suitable polybutadiene polyol is PolyBD® R-45 HTLO or PolyBD® R-45M (both from Cray Valley)

Likewise suitable as polymer P1 are, in addition, polyhydrocarbon polyols, also referred to as oligohydrocarbonols, for example polyhydroxy-functional ethylene-propylene, ethylene-butylene or ethylene-propylene-diene copolymers, for example those produced by Kraton Polymers, USA, or polyhydroxy-functional copolymers of dienes such as 1,3-butadiene or diene mixtures and vinyl monomers such as styrene, acrylonitrile or isobutylene or polyhydroxy-functional polybutadiene polyols, for example those produced by copolymerization of 1,3-butadiene and allyl alcohol, which may also be hydrogenated.

Also suitable as polymer P1 are polyhydroxy-functional acrylonitrile/butadiene copolymers, such as those that can be produced for example from epoxides or amino alcohols and carboxyl-terminated acrylonitrile/butadiene copolymers, which are commercially available under the Hypro® name (formerly Hycar®) CTBN from Emerald Performance Materials, LLC, USA.

Also suitable are hydrophobic polyols P1 having an average molecular weight within a range from 500 to 5000 g/mol selected from the group consisting of polybutadiene diols, polyester diols, polycarbonate diols and polyether diols with a repeat unit having at least 4 carbon atoms, wherein the polyether diols with a repeat unit having at least 4 carbon atoms are preferably polytetramethylene oxide diol, The hydrophobic polyol P1 is in a further preferred embodiment preferably an aliphatic or cycloaliphatic polyol having an average OH functionality of between 2 and 4 that is free of aromatic constituents.

Preference among these is given to aliphatic or cycloaliphatic polyols, preferably a polytetramethylene oxide diol or a polycarbonate diol based on 3-methylpentane-1,5-diol and hexane-1,6-diol, or a polyester carbonate diol based on hexane-1,6-diol and ε-caprolactone, or a polyester diol based on 3-methylpentane-1,5-diol and adipic acid or sebacic acid.

A particularly suitable polyester polyol is a condensation product of 3-methylpentane-1,5-diol and adipic acid or sebacic acid. Polyester polyols of this kind are available for example under the Kuraray® P-2010 trade name from Kuraray.

A particularly suitable aliphatic polycarbonate polyol based on 3-methylpentane-1,5-diol and hexane-1,6-diol and is available for example under the Kuraray® C-2050 trade name from Kuraray.

A particularly suitable aliphatic polyester carbonate polyol based on hexane-1,6-diol and ε-caprolactone is available under the Desmophen® C 1200 trade name from Bayer Material Science.

Particular preference as hydrophobic polyol P1 is given to dimer fatty acid-based polyester polyols obtained from oleo-based (renewable) raw materials.

A dimer fatty acid-based polyester polyol of this kind is preferably liquid at room temperature. It has in particular an OH value within a range from 28 to 120 mg KOH/g.

Such dimer fatty acid-based polyester polyols have an average molecular weight within a range from 950 to 4000 g/mol. They usually have a largely linear structure and an average OH functionality of about 2, especially between 2 and 2.5.

The dimer fatty acid-based polyester polyol is preferably amorphous.

Dimer fatty acid-based polyester diols suitable as polymer P1 are especially obtained from the esterification of at least one dimer fatty acid and/or at least one dimer fatty alcohol with a diol, for example ethylene glycol or butanediol, and/or a dicarboxylic acid, for example adipic acid, in a stoichiometry such that the product is amorphous and is liquid at room temperature and has an OH value within a range from 28 to 120 mg KOH/g.

The dimer fatty acid-based polyester polyol preferably has a content of carbon atoms from renewable sources according to ASTM D6866 based on the total carbon content within a range from 50 to 100%, preferably 60 to 95%, especially 70 to 90%. Such a polyester polyol is amorphous and hydrophobic, and has particularly good compatibility in polyurethane adhesives.

The dimer fatty acid-based polyester polyol used as polymer P1 preferably has an OH value within a range from 34 to 120 mg KOH/g, especially 52 to 60 mg KOH/g. Such a dimer fatty acid-based polyester polyol has an average molecular weight within a range from 950 to 3300 g/mol, especially within a range from 1900 to 2200 g/mol. Such a polymer permits polyurethane compositions having a particularly attractive combination of good expressibility, good adhesion properties and high strength.

Especially suitable are commercially available amorphous dimer fatty acid-based polyester polyols, especially the following grades obtainable under the Priplast® trade name: Priplast® 1837, 1838, 3187, 3196, 3197, 3199 or 3238 (from Croda). Preference among these is given to Priplast® 1838. Also suitable are Solvermol® grades from VASF, especially Solvermol® RC 1005 and Solvermol® 805

The hydrophobic polyol P1 has in all embodiments preferably an average molecular weight within a range from 400 to 3500 g/mol, especially 500 to 3250 g/mol, more preferably 750 to 3000 g/mol, most preferably 1000 to 3000 g/mol.

The hydrophobic polyol P1 has in all embodiments preferably an average OH functionality within a range from 2 to 4, especially 2 to 3.5, more preferably 2 to 3, most preferably 2 to 2.5.

The hydrophobic polyol P1 has in all embodiments a hydroxyl value within a range from 45 to 600 mg KOH/g, especially 50 to 500 mg KOH/g, more preferably 50 to 250 mg KOH/g, most preferably 50 to 200 mg KOH/g.

The first component A additionally comprises at least one hydrophilic polyol P2. This is present in the polyol mixture P.

The polyol mixture P contains 10 to 75 parts by weight of the at least one hydrophilic polyol P2.

When the amount of hydrophilic polyol P2 per 100 parts by weight of hydrophobic polymer P1 is less than 10 parts by weight, the long pot life and subsequent rapid curing effected by the invention can no longer be achieved satisfactorily.

Conversely, when the amount of hydrophilic polyol P2 per 100 parts by weight of hydrophobic polymer P1 is greater than 75 parts by weight, the hydrophobicity of the overall composition can no longer be satisfactorily adjusted.

It is generally the case that higher proportions of hydrophilic polyol P2 tend to enhance the effect according to the invention, i.e. curing after the end of the pot life proceeds with greater rapidity. On the other hand, lower proportions of hydrophilic polyol P2 tend to improve the positive properties of hydrophobicity (for example lower water absorption, improved resistance to aging, better adhesion to low-energy substrates) and also the mechanical properties.

Depending on the desired field of use and the properties desired in connection therewith, the ratio of the polyols P1 and P2 can therefore be adjusted as required within the given limits. In addition, it is possible that the properties just mentioned may also be influenced by further constituents in the composition, for example fillers and the below-described diol P3, which means there are further options for influencing the properties of the composition via formulation measures.

Suitable hydrophilic polyols P2 are in principle all common hydrophilic polyols used in the production of polyurethane polymers that are employable in customary one-component polyurethane compositions that cure via atmospheric moisture. Particularly suitable are hydrophilic polyether polyols, hydrophilic polyester polyols, hydrophilic poly(meth)acrylate polyols, and hydrophilic polycarbonate polyols, and also mixtures of said polyols.

Polyether polyols, also termed polyoxyalkylene polyols or oligoetherols, suitable as polymer P2 are in particular those that are polymerization products of ethylene oxide, 1,2-propylene oxide, oxetane, or mixtures thereof, optionally polymerized with the aid of a starter molecule having two or more active hydrogen atoms such as water, ammonia or compounds having a plurality of OH or NH groups, for example ethane-1,2-diol, propane-1,2-diol and -1,3-diol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, cyclohexane-1,3-dimethanol and -1,4-dimethanol, bisphenol A, hydrogenated bisphenol A, 1,1,1-trimethylolethane, 1,1,1-trimethylolpropane, glycerol, aniline, and also mixtures of the recited compounds. It is possible to use either polyoxyalkylene polyols having a low degree of unsaturation (measured in accordance with ASTM D-2849-69 and expressed in milliequivalents of unsaturation per gram of polyol (mEq/g)), produced for example using so-called double metal cyanide complex catalysts (DMC catalysts), or polyoxyalkylene polyols having a relatively high degree of unsaturation, produced for example using anionic catalysts such as NaOH, KOH, CsOH or alkali metal alkoxides.

Particularly suitable as polyol P2 are polyoxyethylene polyols and polyoxypropylene polyols, especially polyoxyethylene diols, polyoxypropylene diols, polyoxyethylene triols, and polyoxypropylene triols.

Especially suitable as polyol P2 are polyoxyalkylene diols or polyoxyalkylene triols having a degree of unsaturation lower than 0.02 mEq/g and having a molecular weight within a range from 1000 to 15 000 g/mol, as are polyoxyethylene diols, polyoxyethylene triols, polyoxypropylene diols, and polyoxypropylene triols having a molecular weight of 400 to 15 000 g/mol.

Likewise particularly suitable as polyol P2 are so-called ethylene oxide-terminated ("EO-endcapped", ethylene oxide-endcapped) polyoxypropylene polyols. The latter are special polyoxypropylene polyoxyethylene polyols that are obtained for example when pure polyoxypropylene polyols, especially polyoxypropylene diols and triols, are at the end of the polypropoxylation reaction further alkoxylated with ethylene oxide and thus have primary hydroxyl groups. Preference in this case is given to polyoxypropylene polyoxyethylene diols and polyoxypropylene polyoxyethylene triols.

Suitable polyether-based polymers P2 of this kind are available for example under the Acclaim® and Desmophen® trade names from Covestro, especially Acclaim® 4200, Desmophen® 5034, Desmophen® 1381 BT, and Desmophen® 28HS98, under the Voranol® trade name from Dow, especially Voranol® EP 1900 and Voranol® CP 4755, and under the under the Dianol® trade name from Arkema, especially Dianol® 3130 HP.

Also suitable are styrene-acrylonitrile grafted polyether polyols such as those commercially available for example under the trade name Lupranol® from Elastogran GmbH, Germany.

Suitable hydrophilic polyester polyols are especially polyesters that bear at least two hydroxyl groups and are produced by known processes, especially polycondensation of hydroxycarboxylic acids or polycondensation of aliphatic and/or aromatic polycarboxylic acids with dihydric or polyhydric alcohols.

Especially suitable are polyester polyols produced from dihydric to trihydric alcohols such as ethane-1,2-diol, diethylene glycol, propane-1,2-diol, dipropylene glycol, or mixtures of the abovementioned alcohols with organic dicarboxylic acids or the anhydrides or esters thereof, for example succinic acid, glutaric acid, adipic acid, trimethyladipic acid, maleic acid, fumaric acid, phthalic acid, phthalic anhydride, isophthalic acid, terephthalic acid, dimethyl terephthalate, hexahydrophthalic acid, trimellitic acid and trimellitic anhydride or mixtures of the abovementioned acids, as are polyester polyols formed from lactones such as ε-caprolactone.

Particularly suitable are hydrophilic polyester diols, especially those produced from adipic acid, phthalic acid, isophthalic acid, and terephthalic acid as the dicarboxylic acid or from lactones such as ε-caprolactone and from ethylene glycol, diethylene glycol, neopentyl glycol, butane-1,4-diol, hexane-1,6-diol, and cyclohexane-1,4-dimethanol as the dihydric alcohol.

Examples of suitable hydrophilic polyester polyols are those obtainable under the Kuraray® trade name from Kuraray, especially Kuraray® F-510, and those obtainable under the K-Flex® trade name from King Industries, especially K-Flex® 188.

Suitable hydrophilic polycarbonate polyols include in particular those obtainable by reaction for example of the abovementioned alcohols used to form the polyester polyols with dialkyl carbonates such as dimethyl carbonate, diaryl carbonates such as diphenyl carbonate, or phosgene. Likewise suitable are polycarbonates obtainable from the copolymerization of $CO_2$ with epoxides such as ethylene oxide and propylene oxide. Polycarbonate diols, in particular amorphous polycarbonate diols, are particularly suitable.

Further suitable polyols are hydrophilic poly(meth)acrylate polyols.

Particularly suitable polyols P2 are hydrophilic polyester polyols and particularly preferably hydrophilic polyether polyols, especially polyoxyethylene polyol, polyoxypropylene polyol, and polyoxypropylene polyoxyethylene polyol, preferably polyoxyethylene diol, polyoxypropylene diol, polyoxyethylene triol, polyoxypropylene triol, polyoxypropylene polyoxyethylene diol, and polyoxypropylene polyoxyethylene triol.

Most preferably, the hydrophilic polyol P2 is a polyether polyol, especially a polyether polyol having an average OH functionality of at least 2.5, and preferably having propylene glycol repeat units in the polymer backbone.

The hydrophilic polyol P2 has in all embodiments preferably an average molecular weight within a range from 400 to 6000 g/mol, especially 450 to 5500 g/mol, more preferably 500 to 5000 g/mol, most preferably 550 to 5000 g/mol.

The hydrophilic polyol P2 has in all embodiments preferably an average OH functionality within a range from 2 to 4, especially 2 to 3.5, more preferably 2 to 3.

The hydrophilic polyol P2 has in all embodiments a hydroxyl value within a range from 20 to 500 mg KOH/g, especially 25 to 400 mg KOH/g, more preferably 25 to 250 mg KOH/g.

The first component A further comprises preferably at least one diol P3 having two hydroxyl groups that are linked via a C2 to C9 carbon chain. This is present in the polyol mixture P.

The polyol mixture P contains 0 to 25 parts by weight of the at least one diol P3 having two hydroxyl groups that are linked via a C2 to C9 carbon chain.

For the effect according to the invention, it is not necessary for a diol P3 to be present in the polyol mixture P. However, it can be advantageous, especially for the mechanical properties of the polyurethane composition of the invention, that such a diol P3 is present.

Preferred embodiments of the compositions of the invention therefore preferably contain between 5 parts by weight and 25 parts by weight, especially between 10 parts by weight and 20 parts by weight, of the diol P3 per 100 parts by weight of hydrophobic polymer P1.

Suitable as diol P3 are linear or branched alkylene diols having two primary or secondary hydroxyl groups, alkylene diols having one primary and one secondary hydroxyl group, and cycloaliphatic diols.

The diol P3 is preferably a linear aliphatic diol having two primary hydroxyl groups that are linked via a C4 to C9 carbon chain. Such a diol has the advantage of yielding polyurethanes having particularly high moduli of elasticity in the low elongation range, for example between 0 and 5%, which is advantageous for structural adhesives in particular.

In particular, the diol P3 is selected from the group consisting of ethylene glycol, propane-1,3-diol, butane-1,4-diol, pentane-1,5-diol, hexane-1,6-diol, heptane-1,7-diol, octane-1,8-diol, nonane-1,9-diol, butane-1,3-diol, butane-2,3-diol, 2-methylpropane-1,3-diol, pentane-1,2-diol, pentane-2,4-diol, 2-methylbutane-1,4-diol, 2,2-dimethylpropane-1,3-diol (neopentyl glycol), hexane-1,2-diol, butane-1,4-diol, 3-methylpentane-1,5-diol, octane-1,2-diol, octane-3,6-diol, 2-ethylhexane-1,3-diol, 2,2,4-trimethylpentane-1,3-diol, 2-butyl-2-ethylpropane-1,3-diol, 2,7-dimethyloctane-3,6-diol, cyclohexane-1,4-diol, cyclohexane-1,3-dimethanol, and cyclohexane-1,4-dimethanol.

The diol P3 is particularly preferably selected from the group consisting of butane-1,4-diol, pentane-1,5-diol, hexane-1,6-diol, heptane-1,7-diol, octane-1,8-diol, and nonane-1,9-diol.

The diol P3 is most preferably selected from the group consisting of butane-1,4-diol, pentane-1,5-diol, hexane-1,6-diol, and nonane-1,9-diol. These diols are commercially readily available and provide polyurethanes having particularly high moduli of elasticity at low elongation when cured.

In addition to these recited polyols P1 and P2 and the diols P3, it is possible to include small amounts of further low-molecular-weight dihydric or polyhydric alcohols such as diethylene glycol, triethylene glycol, the isomeric dipropylene glycols and tripropylene glycols, the isomeric decanediols and undecanediols, hydrogenated bisphenol A, dimer fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher polyhydric alcohols, low-molecular-weight alkoxylation products of the abovementioned dihydric and polyhydric alcohols, and also mixtures of the abovementioned alcohols. In addition, polyols containing other heteroatoms, for example methyldiethanolamine or thiodiglycol, may also be present.

The first component A further comprises at least one compound T that has at least one thiol group. Suitable are all compounds having at least one thiol or mercapto group that are able to be formulated into the composition of the invention. A thiol group is understood here as meaning an —SH group that is attached to an organic radical, for example an aliphatic, cycloaliphatic or aromatic carbon radical.

Preference is given to compounds having 1 to 6, especially 1 to 4, most preferably 1 or 2 thiol groups. Compounds having a thiol group have the advantage that they do not form complexes with the metal catalyst K, which tend to be poorly soluble, and that the pot life can be adjusted particularly precisely. Compounds having two thiol groups have the advantage that the mechanical properties of the composition when cured are improved.

Examples of suitable compounds T having a thiol group are 3-mercaptopropyltrimethoxysilane, 3-mercaptopropyltriethoxysilane, 3-mercaptopropane-1,2-diol, 2-mercaptotoluimidazole or 2-mercaptobenzothiazole.

Examples of suitable compounds T having more than one thiol group are ethylene glycol di(3-mercaptopropionate), ethylene glycol dimercaptoacetate, dipentaerythritol hexa(3-mercaptopropionate), 2,3-dimercapto-1,3,4-thiadiazole or pentaerythritol tetrakis(3-mercaptopropionate).

The compound T is preferably selected from the group consisting of ethylene glycol di(3-mercaptopropionate), ethylene glycol dimercaptoacetate, dipentaerythritol hexa(3-mercaptopropionate), and 3-mercaptopropyl trimethoxysilane.

The molar ratio of all the thiol groups in the at least one compound T to all metal atoms in the at least one metal catalyst K must be between 1:1 and 250:1. It is preferably between 2:1 and 150:1, especially between 5:1 and 100:1. This quantitative ratio allows the pot life to be adjusted, specifically within the intrinsic limits of the particular composition, through, for example, the content of catalyst, the reactivity of the isocyanates present, and the amount thereof. The lower limit of the pot life is the pot life that is obtained in a given composition when using a defined amount of catalyst without addition of compound T. In many situations suitable for use according to the invention as a structural adhesive or composite material matrix and as a consequence of the large number of isocyanate groups in the presence of a catalyst but without compound T, no actual pot life at all is achieved, and the composition starts to cure almost immediately on mixing the two components.

The upper limit of the adjustable pot life is accordingly the pot life that would be achieved through the uncatalyzed isocyanate-hydroxyl reaction if a catalyst is not used. Even without the use of a catalyst, this reaction will commence at some point after mixing the two components. However, the reaction without catalyst proceeds more slowly and with the development of poorer mechanical properties in the cured material.

The key advantage achieved by the two-component polyurethane composition of the invention is a system that cures and develops strength with extraordinary rapidity, while at the same time having an adequately long pot life that allows it to be processed in a user-friendly manner. This means, for example, that structural bonding may be carried out on relatively large substrates too, which can be subjected to mechanical stress just a very short time after application of the adhesive. This results, for example, in a significant shortening of throughput times in industrial production. A further advantage of the polyurethane compositions of the invention is the possibility of being able to adjust the pot life as described above. This is very advantageous particularly in automated applications and can for example allow further optimization of throughput times in industrial production, since the pot life can be tailored to the desired use.

The amount of compound T in the first component A is preferably within a range from 0.1% to 5% by weight, preferably 0.2% to 2.5% by weight, especially 0.25% to 1.0% by weight, based on component A.

The amount of compound T, based on the overall polyurethane composition, is preferably within a range from 0.04% to 2.0% by weight, preferably 0.08% to 1.0% by weight, especially 0.1% to 0.4% by weight, based on the overall polyurethane composition.

The second component B comprises firstly at least one polyisocyanate I.

The polyisocyanate I is preferably present in relatively high amounts, which is very advantageous for the development of mechanical properties that are good enough for use as a structural adhesive or matrix for composite materials. The second component B preferably contains sufficient polyisocyanate I for there to be present at least 5% by weight, especially at least 6% by weight, preferably at least 7.5% by weight, of isocyanate groups based on the overall polyurethane composition.

The polyisocyanates I used for the production of the polyurethane polymer in the composition of the invention may be any commercially available polyisocyanates suitable for polyurethane production, especially diisocyanates.

Suitable polyisocyanates are in particular monomeric di- or triisocyanates and also oligomers, polymers, and derivatives of monomeric di- or triisocyanates, and any desired mixtures thereof.

Suitable aromatic monomeric di- or triisocyanates are especially tolylene 2,4- and 2,6-diisocyanate and any desired mixtures of these isomers (TDI), diphenylmethane 4,4'-, 2,4'-, and 2,2'-diisocyanate and any desired mixtures of these isomers (MDI), mixtures of MDI and MDI homologs (polymeric MDI or PMDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI), dianisidine diisocyanate (DADI), 1,3,5-tris(isocyanatomethyl)benzene, tris(4-isocyanatophenyl)methane, and tris(4-isocyanatophenyl) thiophosphate.

Suitable aliphatic monomeric di- or triisocyanates are especially tetramethylene 1,4-diisocyanate, 2-methylpentamethylene 1,5-diisocyanate, hexamethylene 1,6-diisocyanate (HDI), 2,2,4- and 2,4,4-trimethylhexamethylene 1,6-diisocyanate (TMDI), decamethylene 1,10-diisocyanate, dodecamethylene 1,12-diisocyanate, lysine diisocyanate and lysine ester diisocyanate, cyclohexane 1,3- and 1,4-diisocyanate, 1-methyl-2,4-diisocyanatocyclohexane and -2,6-diisocyanatocyclohexane and any desired mixtures of these isomers (HTDI or $H_6$TDI), 1-isocyanato-3,3,5-trimethyl-5-isocyanatomethylcyclohexane (=isophorone diisocyanate or IPDI), perhydrodiphenylmethane 2,4'- and 4,4'-diisocyanate (HMDI or $H_{12}$MDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethylxylylene 1,3- and 1,4-diisocyanate (m- and p-TMXDI), bis(1-isocyanato-1-methylethyl)naphthalene, dimer and trimer fatty acid isocyanates such as 3,6-bis(9-isocyanatononyl)-4,5-di-(1-heptenyl)cyclohexene (dimeryl diisocyanate), and α,α,α',α',α'',α''-hexamethyl-1,3,5-mesitylene triisocyanate.

Preference among these is given to MDI, TDI, HDI, and IPDI.

Suitable oligomers, polymers, and derivatives of the recited monomeric di- and triisocyanates are especially those derived from MDI, TDI, HDI, and IPDI. Particularly suitable among these are commercially available grades, especially HDI biurets such as Desmodur® N 100 and N 3200 (from Covestro), Tolonate® HDB and HDB-LV (from Vencorex), and Duranate® 24A-100 (from Asahi Kasei); HDI isocyanurates such as Desmodur® N 3300, N 3600, and N 3790 BA (all from Covestro), Tolonate® HDT, HDT-LV, and HDT-LV2 (from Vencorex), Duranate® TPA-100 and THA-100 (from Asahi Kasei), and Coronate® HX (from Nippon Polyurethane); HDI uretdiones such as Desmodur® N 3400 (from Covestro); HDI iminooxadiazinediones such as Desmodur® XP 2410 (from Covestro); HDI allophanates such as Desmodur® VP LS 2102 (from Covestro); IPDI isocyanurates, for example in solution as Desmodur® Z 4470 (from Covestro) or in solid form as Vestanat® T1890/100 (from Evonik); TDI oligomers such as Desmodur® IL (from Covestro); and also mixed isocyanurates based on TDI/HDI, for example as Desmodur® HL (from Covestro). Also particularly suitable are MDI forms that are liquid at room temperature (so-called "modified MDI"), which are mixtures of MDI with MDI derivatives such as, especially, MDI carbodiimides or MDI uretonimines or MDI urethanes, known under trade names such as Desmodur® CD, Desmodur® PF, Desmodur® PC (all from Covestro) or Isonate® M 143 (from Dow), and mixtures of MDI and MDI homologs (polymeric MDI or PMDI), available under trade names such as Desmodur® VL, Desmodur® VL50, Desmodur® VL R10, Desmodur® VL R20, Desmodur® VH 20 N, and Desmodur® VKS 20F (all from Covestro), Isonate® M 309, Voranate® M 229 and Voranate® M 580 (all from Dow) or Lupranat® M 10 R (from BASF). The abovementioned oligomeric polyisocyanates are in practice typically mixtures of substances having different degrees of oligomerization and/or chemical structures. They preferably have an average NCO functionality of 2.1 to 4.0.

The polyisocyanate is preferably selected from the group consisting of MDI, TDI, HDI, and IPDI, and oligomers, polymers, and derivatives of the recited isocyanates, and mixtures thereof.

The polyisocyanate preferably contains isocyanurate, iminooxadiazinedione, uretdione, biuret, allophanate, carbodiimide, uretonimine or oxadiazinetrione groups.

Particular preference as the polyisocyanate is given to MDI forms that are liquid at room temperature. These are especially what are called polymeric MDI, and MDI containing proportions of oligomers or derivatives thereof. The content of MDI (=diphenylmethane 4,4'-, 2,4'- or 2,2'-diisocyanate and any desired mixtures of these isomers) in such liquid MDI forms is in particular 50% to 95% by weight, in particular 60% to 90% by weight.

Particularly preference as the polyisocyanate is given to polymeric MDI and MDI grades that are liquid at room temperature and contain proportions of MDI carbodiimides or adducts thereof.

With these polyisocyanates, particularly good processing properties and particularly high strengths are obtained.

The polyisocyanate of the second component B may contain proportions of polyurethane polymers having isocyanate groups. Either the second component may include a polyurethane polymer having isocyanate groups that was produced separately, or the polyisocyanate has been mixed with at least one polyol, especially a polyether polyol, with the isocyanate groups present in a stoichiometric excess over the OH groups.

In the second component B of the composition of the invention, polyisocyanate I is preferably present in an amount from 25% by weight to 100% by weight, especially from 30% by weight to 90% by weight, more preferably from 40% by weight to 75% by weight, based on the second component B.

The first component A and/or the second component B further comprises at least one metal catalyst K for the reaction of hydroxyl groups and isocyanate groups that is able to form thio complexes. Suitable metal catalysts K are thus all metal catalysts that may be used as a crosslinking catalyst in polyurethane chemistry and can at the same time form thio complexes with thiols in the presence thereof.

The metal catalyst K is preferably present only in the first component A. This has the advantage of achieving better storage stability.

The amount of metal catalyst K in the first component A is in this embodiment preferably within a range from 0.05% to 2.5% by weight, preferably 0.1% to 2.0% by weight, especially 0.2% to 1.5% by weight, more preferably 0.25% to 1.0% by weight, based on the first component A.

When the catalyst is present in the second component B, the same preferred amount ranges apply as described above, but based on component B.

The amount of metal catalyst K, based on the overall polyurethane composition, is preferably within a range from 0.02% to 1.0% by weight, preferably 0,025% to 0.8% by weight, especially 0.08% to 0.6% by weight, more preferably 0.1% to 0.5% by weight, based on the overall polyurethane composition.

Examples of suitable metal catalysts are compounds of bismuth, zinc, tin or zirconium, including complexes and salts of these metals.

The metal catalyst K preferably includes a bismuth compound, especially a bismuth(III) compound. In addition to the desired properties as a catalyst able to form thio complexes, a bismuth compound has the advantage of low acute toxicity.

A multiplicity of conventional bismuth catalysts may be used as the bismuth compound. Examples are bismuth carboxylates, for example bismuth acetate, oleate, octoate or neodecanoate, bismuth nitrate, bismuth halides such as the bromide, chloride, or iodide, bismuth sulfide, basic bismuth carboxylates such as bismuthyl neodecanoate, bismuth subgallate or bismuth subsalicylate, and mixtures thereof.

In a preferred embodiment, the metal catalyst K is a bismuth(III) complex containing at least one ligand based on 8-hydroxyquinoline. Such complexes are described in EP 1551895. This is preferably a bismuth(III) carboxylate containing one molar equivalent of an 8-hydroxyquinoline ligand.

In a further preferred embodiment, the metal catalyst K is a bismuth(III) complex containing at least one ligand based on a 1,3-ketoamide. Such complexes are described in EP 2791153. This is preferably a bismuth(III) carboxylate containing 1 to 3 molar equivalents of a 1,3-ketoamide ligand.

In addition to the constituents already mentioned, the polyurethane composition may contain further constituents as known to the person skilled in the art from two-component polyurethane chemistry. These may be present in just one component or in both.

Preferred further constituents are inorganic or organic fillers F, such as in particular natural, ground or precipitated calcium carbonates, optionally coated with fatty acids, especially stearic acid, baryte (heavy spar), talcs, quartz powders, quartz sand, dolomites, wollastonites, kaolins, calcined kaolins, mica (potassium aluminum silicate), molecular sieves, aluminum oxides, aluminum hydroxides, magnesium hydroxide, silicas including finely divided silicas from pyrolysis processes, industrially produced carbon blacks, graphite, metal powders such as aluminum, copper, iron, silver or steel, PVC powder or hollow spheres, and also flame-retardant fillers such as hydroxides or hydrates, especially hydroxides or hydrates of aluminum, preferably aluminum hydroxide.

Preferably, the composition of the invention comprises at least one filler F in the first component A, in the second component B or in both components.

The addition of fillers F is advantageous in that it increases the strength of the cured polyurethane composition.

The polyurethane composition preferably comprises at least one filler F selected from the group consisting of calcium carbonate, carbon black, kaolin, baryte, talc, quartz powder, dolomite, wollastonite, kaolin, calcined kaolin, and mica. Particular preference as fillers F is given to ground calcium carbonates, calcined kaolins or carbon black.

It may be advantageous to use a mixture of different fillers. Most preferred are combinations of ground calcium carbonates or calcined kaolins and carbon black.

The content of filler F in the composition is preferably within a range from 5% by weight to 50% by weight, especially 10% by weight to 40% by weight, more preferably 15% by weight to 35% by weight, based on the overall composition.

The content of filler F in the first component A is preferably within 10% to 60% by weight, preferably 15% to 50% by weight, especially 20% to 45% by weight, of filler F, based on component A.

The content of filler F in the second component B is preferably within a range from 0% to 60% by weight, preferably 10% to 50% by weight, especially 10% to 45% by weight, of filler F, based on the second component B.

It is possible for further constituents to be additionally present, especially solvents, plasticizers and/or extenders, pigments, rheology modifiers such as, in particular, amorphous silicas, desiccants such as, in particular, zeolites, adhesion promoters such as, in particular, organofunctional trialkoxysilanes, stabilizers against oxidation, heat, light, and UV radiation, flame-retardant substances, and also surface-active substances, especially wetting agents and defoamers.

The polyurethane composition contains preferably less than 0.5% by weight, especially less than 0.1% by weight, of carboxylic acids, based on the overall composition. Any carboxylate ligands introduced through the metal catalyst are not included here among the stated carboxylic acids.

A preferred polyurethane composition comprises a first component A that, based on component A, comprises
- 30% to 80% by weight, preferably 40% to 75% by weight, especially 50% to 70% by weight, of polyol mixture P,
- 0.1% to 5% by weight, preferably 0.2% to 2.5% by weight, especially 0.25% to 1.0% by weight, of a compound T having at least one thiol group,
- 0.05% to 2.5% by weight, preferably 0.1% to 2.0% by weight, especially 0.2% to 1.5% by weight, more preferably 0.25% to 1.0% by weight, of a metal catalyst K, and
- 10% to 60% by weight, preferably 15% to 50% by weight, especially 20% to 45% by weight, of filler F, and optionally further constituents.

The same or another preferred polyurethane composition comprises a second component B that, based on component B, comprises
- 25% to 100% by weight, preferably 30% to 75% by weight, especially 40% to 60% by weight, of polyisocyanate I,
- 0% to 60% by weight, preferably 10% to 50% by weight, especially 20% to 40% by weight, of a polyol, preferably a hydrophilic polyol P2,
- 0% to 60% by weight, preferably 10% to 50% by weight, especially 10% to 45% by weight, of filler F, and optionally further constituents.

It is advantageous when the first component A and the second component B are formulated such that their mixing ratio in parts by volume or parts by weight is within a range from 10:1 to 1:10, preferably from 5:1 to 1:5, especially from 2:1 to 1:2.

In the mixed polyurethane composition, the ratio before curing between the number of isocyanate groups and the number of groups reactive toward isocyanates is preferably approximately within a range from 1.2 to 1, preferably 1.15 to 1.05. However, it is also possible, although not usually preferable, for the proportion of isocyanate groups to be substoichiometric with respect to groups reactive toward isocyanates.

The two components A and B are produced separately and preferably with the exclusion of moisture. The two components are typically each stored in a separate container. The further constituents of the polyurethane composition may be present as a constituent of the first or second component, further constituents that are reactive toward isocyanate groups preferably being a constituent of the first component. A suitable container for storing the respective component is especially a drum, a hobbock, a bag, a bucket, a can, a cartridge or a tube. The components are both storage-stable, meaning that they can be stored prior to use for several months up to one year or longer, without any change in their respective properties to a degree relevant to their use.

The two components are stored separately prior to the mixing of the composition and are mixed with one another only on use or immediately prior thereto. They are advantageously present in a package consisting of two separate chambers.

In a further aspect, the invention comprises a pack consisting of a package having two separate chambers which respectively contain the first component A and the second component B of the composition.

Mixing is typically effected via static mixers or with the aid of dynamic mixers. During mixing, care must be taken to ensure that the two components are mixed as homogeneously as possible. If the two components are mixed incompletely, local deviations from the advantageous mixing ratio will occur, which can result in a deterioration in the mechanical properties.

On contact of the first component A with the second component B, curing commences through chemical reaction. This involves reaction of the hydroxyl groups and any other substances present that are reactive toward isocyanate groups with the isocyanate groups. Excess isocyanate groups react predominantly with moisture. As a result of these reactions, the polyurethane composition cures to give a solid material. This process is also referred to as crosslinking.

The invention thus also further provides a cured polyurethane composition obtained from the curing of the polyurethane composition as described in the present document.

The two-component polyurethane composition described is advantageously usable as structural adhesive, potting compound or matrix in composite materials.

The invention thus also relates to a method for adhesive bonding a first substrate to a second substrate, which comprises the steps of:
mixing the first and second components described above,
applying the mixed polyurethane composition to at least one of the substrate surfaces to be bonded,
joining the substrates to be bonded within the pot life,
curing the polyurethane composition.

These two substrates may consist of the same material or different materials.

The invention thus also further relates to a method for filling joins and gaps between two substrates, which comprises the steps of:
mixing the first and second components described above,
applying the mixed polyurethane composition to the join or gap,
curing the polyurethane composition.

In these methods for adhesive bonding or for filling joins and gaps, suitable substrates are in particular
glass, glass ceramic, glass mineral fiber mats;
metals and alloys such as aluminum, iron, steel and nonferrous metals, and also surface-finished metals and alloys such as galvanized or chromed metals;
coated and painted substrates, such as powder-coated metals or alloys and painted sheet metal;
plastics, such as polyvinyl chloride (rigid and flexible PVC), acrylonitrile-butadiene-styrene copolymers (ABS), polycarbonate (PC), polyamide (PA), poly(methyl methacrylate) (PMMA), polyester, epoxy resins, especially epoxy-based thermosets, polyurethanes (PUR), polyoxymethylene (POM), polyolefins (PO), polyethylene (PE) or polypropylene (PP), ethylene/propylene copolymers (EPM), and ethylene/propylene/diene terpolymers (EPDM), wherein the plastics may preferably have been surface-treated by means of plasma, corona or flames;
fiber-reinforced plastics, such as carbon fiber-reinforced plastics (CFRP), glass fiber-reinforced plastics (GFRP) and sheet-molding compounds (SMC);
wood, woodbase materials bonded with resins, for example phenolic, melamine or epoxy resins, resin-textile composites and further so-called polymer composites; and
concrete, mortar, brick, plaster, and natural stone such as granite, limestone, sandstone or marble.

In these methods, one or both substrates is preferably a metal or a glass ceramic or a glass or a glass fiber-reinforced plastic or a carbon fiber-reinforced plastic or an epoxy-based thermoset.

The substrates can if required be pretreated prior to application of the composition. Such pretreatments include, in particular, physical and/or chemical cleaning processes and the application of an adhesion promoter, an adhesion promoter solution or a primer.

The adhesive bonding process described gives rise to an article in which the composition joins two substrates to one another.

Said article is especially a sandwich element of a lightweight structure, a built structure, for example a bridge, an industrial product or a consumer product, especially a window, a rotor blade of a wind turbine or a mode of transport, especially a vehicle, preferably an automobile, a bus, a truck, a rail vehicle or a ship, or else an aircraft or a helicopter, or an installable component of such an article.

The polyurethane composition described is characterized by high strength and elasticity that is highly constant over a wide temperature range from −35° C. to 85° C. and by good, largely temperature-independent adhesion properties on metallic substrates. On account of these properties, it is very particularly suitable as structural adhesive for bonds that are subjected to stress outdoors at ambient temperatures.

The invention thus also further provides for the use of the described polyurethane composition as structural adhesive for adhesive bonding of two substrates.

The polyurethane composition described is likewise advantageously usable as a potting compound, especially as a potting compound for the filling of gaps and joins, for repair purposes as a ballast compensation compound or for protection of electronic components.

The polyurethane composition is further preferably used as casting compound, especially as electrical potting compound. In a further aspect, the invention therefore encompasses the use of a two-component polyurethane composition as a potting compound, especially as an electrical potting compound.

In a further aspect, the invention therefore encompasses a method for filling joins and gaps in a substrate, comprising the steps of
a) mixing the first component and the second component of a two-component polyurethane composition as described above,
b) applying the mixed polyurethane composition to the join to be bridged between two substrates or to the gap to be filled on the surface of a substrate,
c) curing the polyurethane composition in the join or gap.

Particularly suitable substrates are metal, plastic, wood, glass, ceramic and fiber-reinforced plastics, especially metal and fiber-reinforced plastics. In a further aspect, the invention therefore also encompasses a filled article that has been filled according to the method described above.

The polyurethane composition is further preferably used as matrix in composite materials. The polyurethane composition serves here as a binder into which fibers or other reinforcing structures are embedded. In a further aspect, the invention therefore encompasses the use of a two-component polyurethane composition as matrix in composite materials.

EXAMPLES

Substances Used:

TABLE 1

Substances used.

| | |
|---|---|
| Voranol CP-4755 | Voranol ® CP 4755 (Dow Chemical); polyether triol; CAS No. 9082-00-2; MW: 5000 g/mol; OH value: 35 mg KOH/g; average OH functionality: 3 |
| Dianol 3130 HP | Dianol ® 3130 HP (Arkema); propoxylated bisphenol A; MW: 982 g/mol; OH value 115 mg KOH/g; average OH functionality: 2 |
| PolyBD R-45 HTLO | Poly bd ® R-45HTLO (Cray Valley); polybutadiene polyol; MW: 2800 g/mol; OH value 47 mg KOH/g; average OH functionality: 2.5 |
| Priplast 1838 | Priplast ® 1838 (Croda); dimer fatty acid-polyester diol; MW: 2000 g/mol; OH value 56 mg KOH/g; average OH functionality: 2 |
| Desmophen 5034 BT | Desmophen ® 5034 BT (Covestro); glycerol-started, ethylene oxide end-capped polypropylene glycol; MW: 4800 g/mol; OH value: 35 mg KOH/g; average OH functionality: 2.6 |
| Desmophen 28HS98 | Desmophen ® 28HS98 (Covestro); polypropylene glycol; MW: 720 g/mol; OH value: 233 mg KOH/g; average OH functionality: 3 |
| Kuraray F-510 | Kuraray ® F-510 (Kuraray); polyester polyol from MPD/TMP adipate; MW: 500 g/mol; OH value: 336 mg KOH/g; average OH functionality: 3 |
| Butane-1,4-diol | Butane-1,4-diol (Sigma Aldrich) |
| GDMP | Thiocure ® GDMP (Bruno Bock Thiochemicals); glycol di(3-mercaptopropionate) |
| Desmodur CD-L | Desmodur ® CD-L (Covestro); modified diphenylmethane 4,4'-diisocyanate (MDI); NCO content: 29.5% by weight |
| Desmodur CD-S | Desmodur ® CD-S (Covestro); modified diphenylmethane 4,4'-diisocyanate (MDI); NCO content: 29.5% by weight |
| Desmodur 44 MC | Desmodur ® 44 MC liquid (Covestro); monomeric diphenylmethane 4,4'-diisocyanate (MDI); NCO content: 33.6% by weight |
| Carbon black | Monarch ® 570 (Cabot Corp.); carbon black (filler) |
| Kaolin | White Tex ® (BASF); calcined aluminum silicate (filler) |
| Chalk | Omyacarb ® 5 GU (Omya); ground natural chalk (filler) |
| Coscat 83 | 35% by weight of Coscat 83 (organobismuth catalyst; Coscat ® 83 (Vertellus Specialties Inc.)) in plasticizer containing 1 molar equivalent of 8-hydroxyquinoline (based on Bi) (2.68 mmol Bi/g) |

Preparation of Polyurethane Compositions

For each composition, the ingredients of the first component A specified in the tables were processed in the specified amounts (in parts by weight or wt.-%), by means of a vacuum dissolver with the exclusion of moisture, into a homogeneous paste and stored. The ingredients of the second component B specified in the tables were likewise processed and stored. The two components were then processed for 30 seconds, by means of a SpeedMixer® (DAC 150 FV, Hauschild), into a homogeneous paste, which was immediately tested as follows:

To determine the mechanical properties, the adhesive was fashioned into a dumbbell shape according to ISO 527, Part 2, 1B and stored/cured at 23° C. and 50% RH (relative humidity) for the time specified in the tables (1 day and 7 days) and then at 90° C. for 7 days. After a conditioning period of 24 h at 23° C. and 50% RH, the modulus of elasticity in the 0.05 to 0.25% elongation range, the tensile strength, and the elongation at break of the test specimens thus produced were measured in accordance with DIN EN ISO 527 on a Zwick Z020 tensile tester at 23° C. and 50% RH and a testing speed of 10 mm/min. To measure the tensile shear strength, various test specimens were produced, in each case by applying the adhesive 1 minute after the end of the mixing time between two heptane-degreased cathodically-electrocoated steel plates in a layer thickness of 2 mm and over an overlapping bonding area of 15×45 mm. The test specimens were stored/cured for 24 h at 23° C. ("cool conditions"). Some of the samples were then additionally stored/cured for 10 days under hot and humid conditions (40° C. and 100% relative humidity). After a conditioning period of 24 h at 23° C. and 50% RH, the tensile shear strength was determined in accordance with DIN EN 1465.

Viscosity was measured on an MCR 302 parallel-plate rheometer (Anton Paar) with a plate diameter of 25 mm and a plate distance of 1 mm at a frequency of $10\ s^{-1}$ and a temperature of 20° C. This was done by first manually mixing the two components for 30 sec in a beaker using a spatula and immediately applying them to the plates for the measurement.

The results of the measurements are given in the tables. In the tables, compositions according to the invention are identified as "I" (I-1 to I-11) and non-inventive reference compositions as "R" (R-1 to R-4).

TABLE 2

Example compositions R-1, R-2, I-1, and I-2.

| | Example | | | |
|---|---|---|---|---|
| | R-1 | R-2 | I-1 | I-2 |
| First component A (amounts in wt-%, based on first component A) | | | | |
| PolyBD R-45 HTLO | 99.0 | — | 80.0 | 90.0 |
| Priplast 1838 | — | 99.0 | — | — |
| Desmophen 28HS98 | — | — | 19.0 | 9.0 |
| GDMP | 0.4 | 0.4 | 0.4 | 0.4 |
| Coscat 83 | 0.6 | 0.6 | 0.6 | 0.6 |
| Second component B (amounts in wt-%, based on first component B) | | | | |
| Desmodur CD-S | 100.0 | 100.0 | 100.0 | 100.0 |
| Mixture of first component A and second component B | | | | |
| Mixing ratio (parts by weight B per 10 parts by weight A) | 1.36 | 1.61 | 6.24 | 6.24 |
| Time $t_1$ [min] until viscosity = 100 Pa · s | After only | After only | 17.8 | 19.8 |
| Time $t_2$ [min] until viscosity = 500 Pa · s | 19 min 42 Pa · s | 17 min 50 Pa · s | 19.8 | 22.4 |
| Time $t_3$ [min] until viscosity = 1000 Pa · s | | | 20.6 | 23.6 |
| Time $t_3$ minus time $t_2$ | >10 | >10 | 0.8 | 1.2 |

TABLE 3

Example compositions R-3, R-4, I-3, I-4, and I-5.

| | Example | | | | |
|---|---|---|---|---|---|
| | R-3 | R-4 | I-3 | I-4 | I-5 |
| First component A (amounts in wt-%, based on first component A) | | | | | |
| Priplast 1838 | 99.0 | 99.8 | 79.2 | 79.2 | 79.2 |
| Desmophen 28HS98 | — | — | 19.8 | — | — |
| Desmophen 5034 BT | — | — | — | 19.8 | — |
| Dianol 3130 HP | — | — | — | — | 19.8 |
| GDMP | 0.4 | — | 0.4 | 0.4 | 0.4 |
| Coscat 83 | 0.6 | 0.2 | 0.6 | 0.6 | 0.6 |
| Second component B (amounts in wt-%, based on first component B) | | | | | |
| Desmodur CD-S | 20.0 | 20.0 | 20.0 | 20.0 | 20.0 |
| Desmodur 44 MC | 19.0 | 19.0 | 19.0 | 19.0 | 19.0 |

TABLE 3-continued

Example compositions R-3, R-4, I-3, I-4, and I-5.

| | Example | | | | |
|---|---|---|---|---|---|
| | R-3 | R-4 | I-3 | I-4 | I-5 |
| Desmophen 5034 BT | 46.0 | 46.0 | 46.0 | 46.0 | 46.0 |
| Carbon black | 15.0 | 15.0 | 15.0 | 15.0 | 15.0 |
| Mixture of first component A and second component B | | | | | |
| Mixing ratio (parts by weight B per 10 parts by weight A) | 4.26 | 4.16 | 6.87 | 3.94 | 5.12 |
| Time $t_1$ [min] until viscosity = 100 Pa·s | After 17 min only | 7.3 | 11.3 | 22.8 | 27.3 |
| Time $t_2$ [min] until viscosity = 500 Pa·s | 50 Pa·s | 16.8 | 13.4 | 28.9 | 33.6 |
| Time $t_3$ [min] until viscosity = 1000 Pa·s | | 22.2 | 14.5 | 32.4 | 37.9 |
| Time $t_3$ minus time $t_2$ | >10 | 5.4 | 1.1 | 3.5 | 4.3 |

The viscosity measurements in Tables 2 to 5 show that the compositions of the invention continue to have low viscosity for a comparatively long time (time $t_1$), but then cure very rapidly (time $t_2$ and $t_3$, especially difference between time $t_2$ and $t_3$).

The subtraction of time t3 minus time t2 shows the rate of curing. The smaller this value, the more rapidly the composition cures. In order to exhibit a rate of curing that is according to the invention adequate, the value for $t_3$ minus $t_2$ should be less than 5, preferably less than 4.5. In particularly preferred embodiments, the value for $t_3$ minus $t_2$ is less than 2, especially less than 1.5.

TABLE 4

Example compositions I-6 to I-9.

| | Example | | | |
|---|---|---|---|---|
| | I-6 | I-7 | I-8 | I-9 |
| First component A (amounts in wt-%, based on first component A) | | | | |
| Priplast 1838 | 79.2 | 90.0 | 69.3 | 59.4 |
| Desmophen 28HS98 | — | 9.0 | 29.7 | 39.6 |
| Kuraray F-510 | 19.8 | — | — | — |
| GDMP | 0.4 | 0.4 | 0.4 | 0.4 |
| Coscat 83 | 0.6 | 0.6 | 0.6 | 0.6 |
| Second component B (amounts in wt-%, based on first component B) | | | | |
| Desmodur CD-S | 20.0 | 20.0 | 20.0 | 20.0 |
| Desmodur 44 MC | 19.0 | 19.0 | 19.0 | 19.0 |
| Desmophen 5034 BT | 46.0 | 46.0 | 46.0 | 46.0 |
| Carbon black | 15.0 | 15.0 | 15.0 | 15.0 |
| Mixture of first component A and second component B | | | | |
| Mixing ratio (parts by weight B per 10 parts by weight A) | 8.38 | 5.45 | 8,178 | 9,482 |
| Time $t_1$ [min] until viscosity = 100 Pa·s | 19.8 | 27.7 | 11.2 | 9.8 |
| Time $t_2$ [min] until viscosity = 500 Pa·s | 25.4 | 32.7 | 12.9 | 11.1 |
| Time $t_3$ [min] until viscosity = 1000 Pa·s | 28.9 | 35.3 | 13.7 | 11.8 |
| Time $t_3$ minus time $t_2$ | 3.5 | 2.6 | 0.8 | 0.7 |

TABLE 5

Example compositions I-10 and I-11.

| | Example | |
|---|---|---|
| | I-10 | I-11 |
| First component A (amounts in wt-%, based on first component A) | | |
| Priplast 1838 | 47.0 | 44.0 |
| Desmophen 28HS98 | 15.0 | 6.0 |
| Butane-1,4-diol | — | 6.3 |
| Chalk | 30.0 | 35.0 |
| Carbon black | 8.0 | 8.0 |
| GDMP | 0.3 | 0.3 |
| Coscat 83 | 0.4 | 0.4 |
| Second component B (amounts in wt-%, based on first component B) | | |
| Desmodur CD-L | 44 | 44 |
| Voranol CP-4755 | 32 | 32 |
| Kaolin | 15 | 15 |
| Carbon black | 10 | 10 |
| Mixture of first component A and second component B | | |
| Mixing ratio A:B (v/v) | 2:1 | 1:1 |
| Time $t_1$ [min] until viscosity = 100 Pa·s (25° C./40° C./55° C.) | 11.0/4.6/2.3 | 4.8/—/— |
| Time $t_2$ [min] until viscosity = 500 Pa·s (25° C./40° C./55° C.) | 13.0/5.5/2.7 | 6.6/—/— |
| Time $t_3$ [min] until viscosity = 1000 Pa·s (25° C./40° C./55° C.) | 14.0/5.9/2.0 | 7.9/—/— |
| Time $t_3$ minus time $t_2$ (25° C./40° C./55° C.) | 1.0/0.4/0.2 | 1.3/—/— |

TABLE 6

Measured values for example compositions I-10 and I-11.

| | Example | |
|---|---|---|
| | I-10 | I-11 |
| Measurement results | | |
| Elastic modulus (0.05-0.25% extension) [MPa] | 8.0 | 31.7 |
| Elastic modulus (0.5-5.0% extension) [MPa] | 6.6 | 28.7 |
| Tensile strength [MPa] | 5.8 | 12.4 |
| Elongation at break [%] | 172 | 228 |
| Tensile shear strength (cool conditions) [MPa] | 3.4 | 8.0 |
| Fracture profile (cool conditions) [% cohesive] | 100 | 100 |
| Tensile shear strength (7 d hot/humid conditions) [MPa] | n/m | 7.3 |
| Fracture profile (7 d hot/humid conditions) [% cohesive] | n/m | 100 |

"n/m" means that the value was not measured.

Table 5 shows for experiment I-10 that the application temperature too has an influence on the rate of curing and the pot life. This means that the application and curing of the composition can be additionally influenced via the application temperature too.

Table 6 shows that the use of a diol P3 (in this case butane-1,4-diol in example I-11) has a clearly positive influence on the mechanical properties of a composition of the invention.

The invention claimed is:

1. A polyurethane composition comprising a first component A and a second component B, wherein
the first component A comprises
between 30% and 99% by weight based on component A of a polyol mixture P comprising 100 parts by weight of at least one hydrophobic polyol P1, 10 to 75 parts by weight of at least one hydrophilic polyol P2, 0 to 25 parts by weight of at least one diol P3 having two hydroxyl groups that are linked via a C2 to C9 carbon chain, and also at least one compound T having at least one thiol group, wherein said compound T is selected from the group consisting of 3-mercaptopropane-1,2-diol, 2-mercapto-toluimidazole, 2-mercapto-benzothiazole, and polythiols having 2 to 6 thiol groups; and the second component B comprises at least one polyisocyanate I;

wherein one of component A and component B additionally comprises at least one metal catalyst K for the reaction of hydroxyl groups and isocyanate groups that is able to form thio complexes and the molar ratio of all the thiol groups in the at least one compound T to all metal atoms in the at least one metal catalyst K is between 1:1 and 250:1.

2. The polyurethane composition as claimed in claim 1, wherein the metal catalyst K comprises a bismuth (III) compound.

3. The polyurethane composition as claimed in claim 2, wherein the bismuth (III) compound additionally contains an 8-hydroxyquinoline ligand or a 1,3-ketoamide ligand.

4. The polyurethane composition as claimed in claim 1, wherein the diol P3 is a linear aliphatic diol having two primary hydroxyl groups that are linked via a C4 to C9 carbon chain.

5. The polyurethane composition as claimed in claim 1, wherein the at least one compound T is selected from the group consisting of ethylene glycol di(3-mercaptopropionate), ethylene glycol dimercaptoacetate, and dipentaerythritol hexa (3-mercaptopropionate).

6. The polyurethane composition as claimed in claim 1, wherein the molar ratio of all the thiol groups in the at least one compound T to all metal atoms in the at least one metal catalyst K is between 5:1 and 100:1.

7. The polyurethane composition as claimed in claim 1, wherein the metal catalyst K is present in the first component A.

8. The polyurethane composition as claimed in claim 1, wherein the hydrophilic polyol P2 is a polyether polyol.

9. The polyurethane composition as claimed in claim 1, wherein the polyisocyanate I is a form of diphenylmethane 4,4'-, 2,4'- or 2,2'-diisocyanate that is liquid at room temperature or any desired mixtures of these isomers (MDI) in the form of polymeric MDI or MDI containing proportions of oligomers or derivatives.

10. The polyurethane composition as claimed in claim 1, wherein the second component B comprises a polyurethane polymer containing isocyanate groups.

11. The polyurethane composition as claimed in claim 1, wherein the hydrophobic polyol P1 is a polybutadiene polyol, a dimer fatty acid-based polyester polyol, a polytetramethylene oxide diol, or a mixture of the polyols, wherein the polyol P1 has an average OH functionality of between 2 and 2.5.

12. A method for the adhesive bonding of a first substrate to a second substrate, comprising the steps of:
mixing the first and second components of a polyurethane composition as claimed in claim 1,
applying the mixed polyurethane composition to at least one of the substrate surfaces to be bonded,
joining the substrates to be bonded within the open time,
curing the polyurethane composition.

13. An article resulting from the adhesive bonding method as claimed in claim 12.

* * * * *